Feb. 9, 1937.  P. M. CURRIER  2,070,473
CONTROL SYSTEM
Filed March 28, 1936
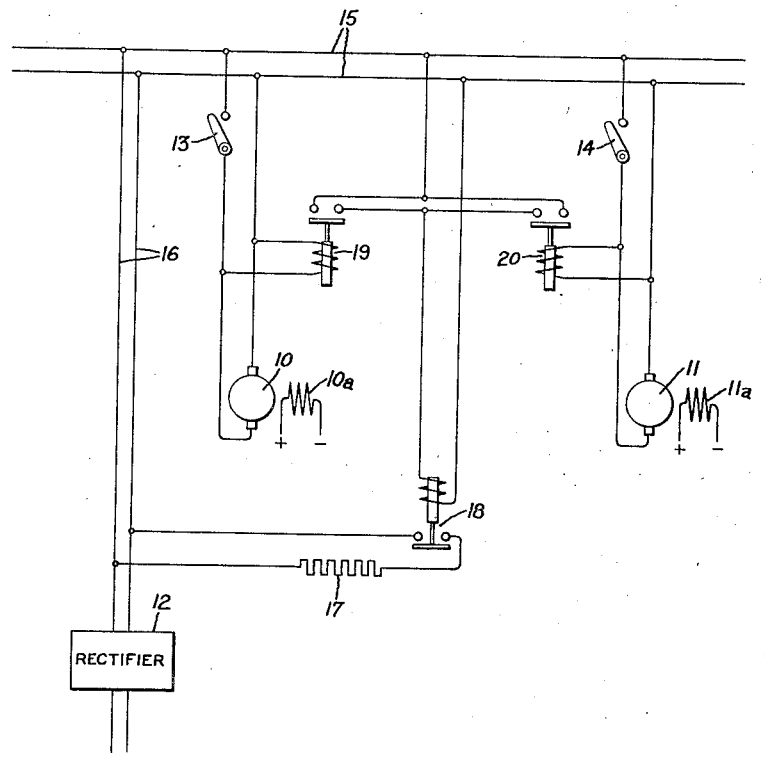
Inventor:
Philip M. Currier,
by Harry E. Dunham
His Attorney.

Patented Feb. 9, 1937

2,070,473

UNITED STATES PATENT OFFICE 2,070,473

CONTROL SYSTEM

Philip M. Currier, Ballston Lake, N. Y., assignor to General Electric Company, a corporation of New York Application March 28, 1936, Serial No. 71,408

2 Claims. (Cl. 172—179)

This invention relates to control systems, more particularly to motor control systems, and it has for an object the provision of a simple, reliable and improved system of this character.

More specifically the invention relates to control systems in which a plurality of translating devices, one of which is an electric motor, are arranged to be supplied from a rectifier and a more specific object is the provision of means to provide for the condition of operation of the motor as a generator when an overhauling load is imposed on the motor. The overhauling load condition is frequently encountered in practice, for example, in elevator systems, in which the load on the motor may be either hauling or overhauling depending on the number of passengers in the car. Accordingly, in illustrating this invention in one form thereof, it is shown as embodied in a motor control system in which a plurality of motors, such as the driving motors of an elevator system, are arranged to be supplied from a rectifier.

In carrying the invention into effect in one form thereof, a plurality of translating devices, one of which is a direct current motor, are arranged to be supplied from a rectifier and a current consuming device is provided, together with means responsive to overhauling load conditions for connecting the current consuming device in circuit with the motor to provide for generator action.

For a better and more complete understanding of the invention reference should now be had to the following specification and to the accompanying drawing, the single figure of which is a simple, diagrammatical illustration of an embodiment of the invention.

Referring now to the drawing, a plurality of translating devices, such as the direct current electric motors 10 and 11, are arranged to be supplied from a rectifier 12. The motors 10 and 11 are provided with field windings 10a and 11a, respectively, which are supplied from a suitable source, represented by plus and minus signs. A plurality of line switches 13 and 14 are provided for respectively connecting the armatures of motors 10 and 11 to the buses 15, which in turn are connected by means of conductors 16 to the output circuit of the rectifier 12.

In parallel with the rectifier is a circuit comprising a current consuming device such as the resistance 17 and an electromagnetically operated contactor 18. In order to provide for operation of the contactor 18 to connect the resistance 17 in parallel with the rectifier and therefore in circuit with the armatures of the motors, a plurality of voltage responsive relays 19 and 20 are connected on the motor side of line switches 13 and 14, so as to be responsive to the terminal voltage of motors 10 and 11 respectively.

These relays are designed or set to respond to a voltage which exceeds by a predetermined amount the highest voltage that the rectifier can deliver.

The operation of the system is as follows:

The motors 10 and 11 are connected to the rectifier 12 by closing their respective line switches 13 and 14. Either or both of these switches may be closed. If one motor is taking power from the rectifier when the load on the other motor becomes overhauling, the motor which is overhauled can supply power to the first motor. Under these conditions, the voltage of the circuit does not exceed the value at which the voltage relays 19 and 20 are set to respond, and the contactor 18 remains open.

However, if one motor, for example, motor 10 is disconnected and not taking power from the rectifier, and if at the same time the motor 11 is overhauled by its load, the direction of current through the motor must reverse, and is, therefore, prevented from flowing because current cannot flow backward through the rectifier. As a result of the overhauling load, the terminal voltage of motor 11 will rise above the rectifier voltage to the value at which the relay 20 is set to respond. At this voltage, relay 20 will close its contacts to complete an energizing circuit for the operating coil of contactor 18. In responding to energization, this contactor closes its contacts to connect resistance 17 in parallel with rectifier 12 and motor 11 can now operate as a generator and pump energy into the resistance 17 in which it is dissipated in the form of heat. The drop-out voltage of relays 19 and 20 should be adjusted so that they do not drop out when the resistance load is thrown on the regenerating motor.

When line switch 14 is opened and the motor stopped as by a mechanical brake, its voltage decreases below the set value of relay 20, which thereupon opens to deenergize contactor 18 and open the parallel circuit through resistance 17.

Although in accordance with the provisions of the patent statutes, this invention is described as embodied in concrete form, it will be understood that the elements and connections shown are merely illustrative and that the invention is not limited thereto, since alterations and modifications will readily suggest themselves to persons skilled in the art without departing from the true spirit of the invention or from the scope of the annexed claims.

What I claim as new and desire to secure by Letters Patent of the United States, is:—

1. A motor control system comprising a rectifier, a plurality of direct current motors arranged to be supplied therefrom, a resistance element, a plurality of voltage relays, one for each of said motors and responsive to a rise in the terminal voltage of its associated motor for connecting said resistance in circuit therewith.

2. A motor control system comprising a rectifier, a plurality of direct current motors supplied therefrom, a resistance element, and a plurality of voltage relays one connected to the terminals of each of said motors and responsive to a voltage of its associated motor in excess of the no-load voltage of said rectifier and a contactor controlled by said relays for connecting said resistance in parallel with said rectifier.

PHILIP M. CURRIER.